US008879147B2

(12) United States Patent
Schonbrun et al.

(10) Patent No.: US 8,879,147 B2
(45) Date of Patent: Nov. 4, 2014

(54) METHODS AND APPARATUS FOR SCANNING MICROSCOPY USING ONE OR MORE FRESNEL ZONE PLATES

(75) Inventors: Ethan Schonbrun, Newton Highlands, MA (US); Kenneth B. Crozier, Cambridge, MA (US)

(73) Assignee: President and Fellows of Harvard College, Cambridge, MA (US)

( * ) Notice: Subject to any disclaimer, the term of this patent is extended or adjusted under 35 U.S.C. 154(b) by 562 days.

(21) Appl. No.: 13/319,123

(22) PCT Filed: May 7, 2010

(86) PCT No.: PCT/US2010/001355
§ 371 (c)(1),
(2), (4) Date: Feb. 7, 2012

(87) PCT Pub. No.: WO2010/129060
PCT Pub. Date: Nov. 11, 2010

(65) Prior Publication Data
US 2012/0127568 A1 May 24, 2012

Related U.S. Application Data

(60) Provisional application No. 61/176,433, filed on May 7, 2009.

(51) Int. Cl.
*G02B 21/08* (2006.01)
*G02B 21/00* (2006.01)
*G02B 5/18* (2006.01)

(52) U.S. Cl.
CPC .......... *G02B 21/0052* (2013.01); *G02B 5/1885* (2013.01)
USPC .......................................... 359/385; 359/565

(58) Field of Classification Search
None
See application file for complete search history.

(56) References Cited

U.S. PATENT DOCUMENTS

| 4,539,482 | A |   | 9/1985 | Nose |
| 5,074,667 | A |   | 12/1991 | Miyatake |
| 5,162,941 | A | * | 11/1992 | Favro et al. ................... 359/386 |

OTHER PUBLICATIONS

International Search Report and Written Opinion dated Jul. 28, 2010 for International Application No. PCT/US2010/001355.
Wang et al., "Achromatic Fresnel optics for wideband extreme-ultraviolet and X-ray imaging," Nature 424:50-53, 2003.
Wu et al., "The application of Fresnel zone plate based projection in optofluidic microscopy," Optics Express 16(20):15598-15602, 2008.

* cited by examiner

*Primary Examiner* — Derek S Chapel
(74) *Attorney, Agent, or Firm* — Wolf, Greenfield & Sacks, P.C.

(57) ABSTRACT

Microscopy methods and apparatus in which one or more microfabricated optical elements (e.g., one or more Fresnel zone plates) operate as one or an array of objective lenses. A single object or a plurality of objects may be scanned in parallel. A single, low-numerical-aperture relay optic can be used with the one or more optical elements eliminating the need for one or more confocal pinhole apertures. When an array of optical elements is used, hundreds to thousands of objects can be imaged or inspected simultaneously onto a two-dimensional imaging device, such as a CCD array. The microfabricated optical elements can be readily configured for imaging with a solid immersion medium. Imaging resolutions on the order of one wavelength of the illumination source, and less, can be achieved.

35 Claims, 10 Drawing Sheets

METHODS AND APPARATUS FOR SCANNING MICROSCOPY USING ONE OR MORE FRESNEL ZONE PLATES

CROSS-REFERENCE TO RELATED U.S. APPLICATIONS

The present application is a national stage application under 35 U.S.C. §371 of International Patent Application No. PCT/US2010/001355 filed May 7, 2010 and entitled "METHODS AND APPARATUS FOR SCANNING MICROSCOPY USING ONE OR MORE FRESNEL ZONE PLATES," which claims priority to U.S. provisional patent application No. 61/176,433 filed on May 7, 2009, both of which are incorporated herein by reference.

STATEMENT REGARDING GOVERNMENT FUNDING

This invention was made with government support under Grant No. HR0011-06-1-0044 awarded by DARPA and Grant No. PHY-0646094 awarded by National Science Foundation. The Government has certain rights in this invention.

BACKGROUND

Scanning near-field optical microscopes have been developed in recent years to provide high-resolution optical imaging of micron and submicron-sized objects. (See, for example, E. Betzig and J. K. Trautman, *Science*, 257, (1992) 189.) Both near-field and confocal microscopes use small apertures to restrict light collected from an object to tightly confined regions in the object plane. The spatial resolution of these techniques is limited by the aperture size and the collection efficiency, which affect the signal to noise ratio. While both near-field and confocal microscopies have proven to be powerful imaging techniques, they typically require specialized small-aperture devices and elaborate aperture positioning and scanning instrumentation.

SUMMARY

The inventors have appreciated that near-field optical microscopes and confocal microscopes are not readily adaptable to certain applications, such as those requiring parallel inspection of micron and submicron objects. To this end, the inventors have recognized and appreciated that microfabricated Fresnel zone plates can be adapted for use in various high-resolution microscopy systems.

In view of the foregoing, the present disclosure is directed to inventive methods and apparatus for microscopy using one or more Fresnel zone plates. In certain embodiments, one or more Fresnel zone plates may be employed in combination with a relay optic for use in scanning confocal microscopy applications. In various aspects, since a Fresnel zone plate (or an array of zone plates) can be microfabricated, the zone plate(s) can be made inexpensively, be readily redesigned for various applications, and can be integrated onto substrates and into microstructures. In other aspects, each of the focal length, numerical aperture, and field-of-view of a zone plate can be determined by selecting a particular predetermined micropattern design for the zone plate.

In exemplary implementations disclosed herein, multiple zone plates can be fabricated in one- and two-dimensional arrays and used in parallel with a single relaying diffractive optic. The zone plate/relay optic combination comprises a readily-adaptable optical apparatus suitable for a variety of microscopy applications, and in some instances may be configured to provide imaging resolutions on the order of 500 nanometers and less.

In sum, one embodiment of the present invention is directed to an optical apparatus for microscopy. The apparatus comprises an illumination source configured to illuminate an object and at least one microfabricated Fresnel zone plate. The object may be microscopic in size. The apparatus may further comprise a detector configured to receive a portion of radiation emitted from the object and collected by the zone plate. In this implementation, the zone plate may be disposed between the object and the detector.

Another embodiment is directed to an optical apparatus for microscopy. The apparatus comprises at least one microfabricated optical element disposed on a substrate. The optical element may be a microlens, a diffractive optical element, or a Fresnel zone plate. In various aspects, the optical element exhibits focusing for radiation incident on the optical element, and the focusing can be characterized by a focal length. The apparatus may further comprise a relay optic disposed in proximity to the optical element and aligned with an optical axis of the optical element. The relaying optic may be configured to operate as a confocal pinhole aperture for the optical element.

Another embodiment is directed to a method comprising illuminating an object to be inspected, and collecting a portion of radiation emitted from the object with at least one microfabricated optical element or Fresnel zone plate disposed on a substrate. The optical element or zone plate may be characterized optically by a focal length. The method may further comprise relaying at least a portion of the collected radiation with a relaying optic that is configured to operate as a confocal pinhole aperture for the optical element or zone plate.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

The foregoing and other aspects, embodiments, and features of the present teachings can be more fully understood from the following description in conjunction with the accompanying drawings.

BRIEF DESCRIPTION OF THE DRAWINGS

The skilled artisan will understand that the figures, described herein, are for illustration purposes only. It is to be understood that in some instances various aspects of the invention may be shown exaggerated or enlarged to facilitate an understanding of the invention. In the drawings, like reference characters generally refer to like features, functionally similar and/or structurally similar elements throughout the various figures. The drawings are not necessarily to scale, emphasis instead being placed upon illustrating the principles of the teachings. The drawings are not intended to limit the scope of the present teachings in any way.

Figure 1A:
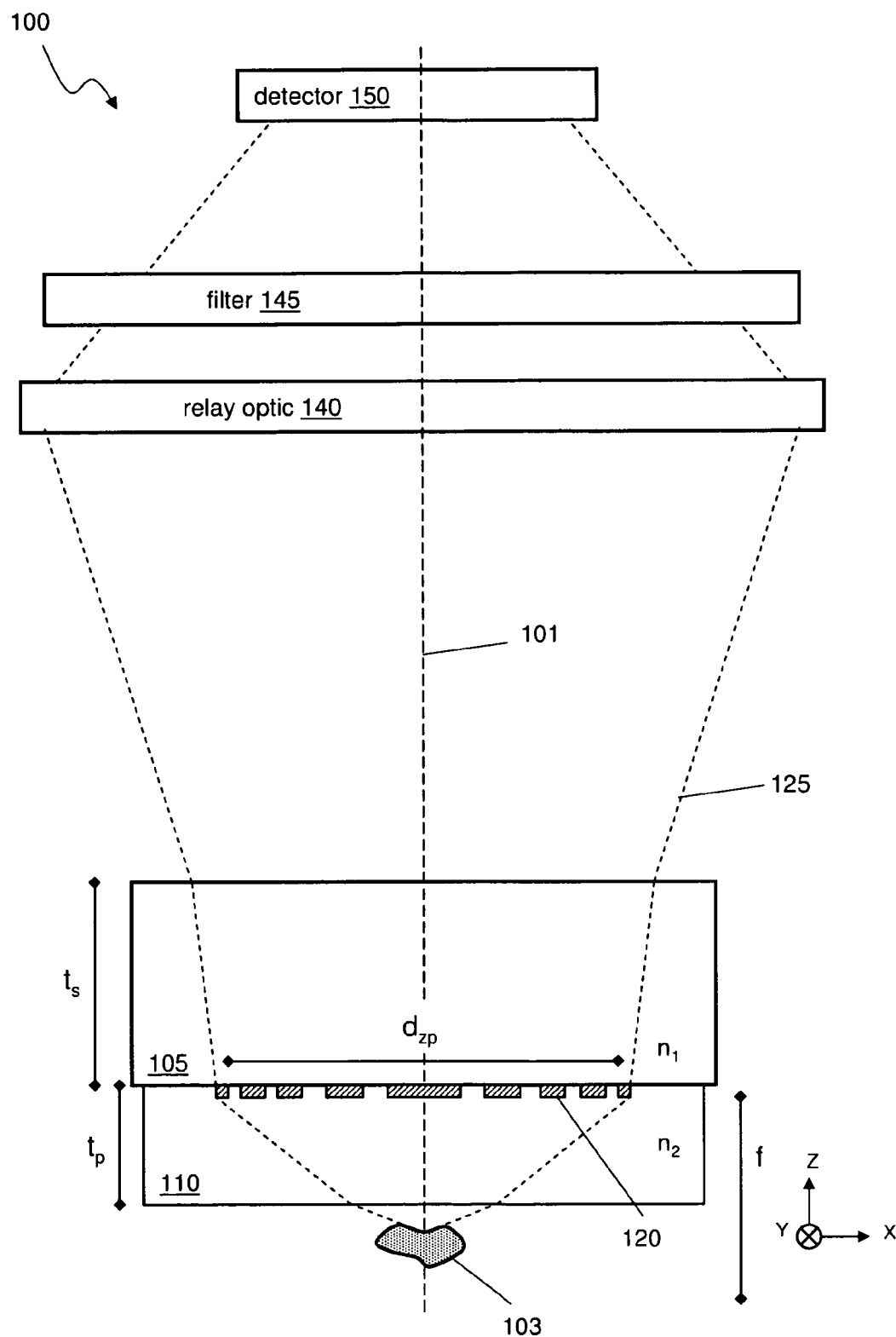
FIG. 1A depicts an exemplary zone-plate-based optical microscopy system containing a zone plate 120 and relay optic 140 according to one embodiment of the present invention.

The features and advantages of the present invention will become more apparent from the detailed description set forth below when taken in conjunction with the drawings.

DETAILED DESCRIPTION

Introduction

Embodiments of the present invention are directed to methods and apparatus for optical microscopy that employ one or more microfabricated Fresnel zone plates. In some exemplary embodiments discussed in greater detail below, a single relay optic may be employed together with one or more Fresnel zone plates to achieve imaging resolution on the order of one optical wavelength or less. Methods and apparatus according to various embodiments of the present invention may be used for imaging small objects, e.g., microparticles, cells, and biochemical and biological specimens, and may be used in scanning confocal microscopy applications. In some embodiments, the disclosed methods and apparatus may be used to detect radiation levels from localized regions as small as one micron in diameter or less. In some exemplary implementations, imaging may be carried out in parallel with an array of microfabricated zone plates, and one or more zone plates may be integrated with microstructures, e.g., microfluidic chips.

By way of introduction, the inventors have recognized several drawbacks of conventional confocal pinhole and near-field microscopy systems. In these conventional systems, a pinhole must be precisely located in front of the microscope's image plane such that radiation emitted from a localized area in the focal plane of the microscope's objective lens will pass through the pinhole. For near-field microscopes, the pinhole must be positioned in close proximity to the object, typically much less than an optical wavelength from the surface of the object. Pinhole alignment and positioning can be difficult in these conventional systems, and accordingly such systems are not readily adaptable to high-resolution parallel imaging applications.

In view of the forgoing, the inventors have developed zone-plate based optical microscopy apparatus and methods, examples of which can be readily implemented as a single microfabricated Fresnel zone plate and a small numerical aperture (NA) relay optic (or multiple zone plates and a relay optic). The relay optic may be configured to operate as a confocal pinhole aperture and thereby eliminate the need for a conventional confocal pinhole aperture (and therefore eliminate the need for precise positioning of same typically required in conventional confocal microscopes). A conventional confocal pinhole aperture typically comprises a small-diameter hole (pinhole) in an opaque material. The diameter of the hole may be about 3 mm or less, and the pinhole is located at a conjugate plane of focus for the microscope.

More specifically, Fresnel zone plates provide multiple advantages as integrated objective lenses; for example, they are planar and are capable of significantly short focal lengths (e.g., focal lengths less than 50 microns, less than 20 microns, less than 10 microns, and less than 5 microns in some implementations). Fresnel zone plates can also exhibit significantly large numerical aperture (NA) values (e.g., NA values between about 0.5 and about 3, more particularly between 0.5 and 3). Based on the foregoing, the inventors have recognized and appreciated that an effective imaging system may be formed using a relatively short focal length zone plate together with a relatively low NA relay optic. Such an imaging system provides appreciably high collection efficiency and high resolution. In particular, the relatively low NA relay optic essentially operates as a spatial filter in the system, while the zone plate provides high magnification, allowing the relay optic to be used as a confocal pinhole. As a result, instead of using a microscope objective and pinhole aperture as is done for conventional scanning confocal microscopy, the methods and apparatus described herein, including a short focal length Fresnel zone plate and a low NA relay lens, may effectively perform the functions of a conventional confocal microscope's objective lens, condenser lens, and pinhole aperture.

As a further advantage of the methods and apparatus described herein, parallel confocal microscopy may be performed without an array of pinhole apertures. In particular, in exemplary implementations described in detail below, scanning microscopy may be performed in parallel using an array of multiple Fresnel zone plates and a single relay optic. The single relay optic may operate as a pinhole aperture for all the zone plates in the array. The relaxed tolerances and simplicity of a zone-plate-based microscopy scheme may be particularly advantageous in microfluidic and MEMS-based systems.

An exemplary microscopy apparatus according to one embodiment of the present invention is depicted in FIG. 1A. In various aspects described below, the zone plate/relay optic combination can provide imaging resolutions as small as one wavelength of the imaging radiation, or less.

Description of Apparatus

Referring to FIG. 1A in overview, a zone-plate microscopy apparatus 100 according to one embodiment of the present invention comprises at least one Fresnel zone plate 120 and a relay optic 140. The drawing of FIG. 1A represents an elevation view of the apparatus and shows the zone plate in cross section. The zone plate 120 may be disposed on a substrate 105, and may, in some implementations, be covered with a layer of material 110 (examples of which are discussed further below). The apparatus 100 may further comprise an optical filter 145 and a detector 150. The drawing also depicts marginal optical rays 125 that are outer most rays collected by the zone plate/relay optic combination. An object 103 to be inspected may be positioned in a focal region of the zone plate 120. In exemplary implementations, the relay optic 140, zone plate 120, and object 103 generally are aligned along an optical axis 101.

For purposes of the following descriptions, the microfabricated optical element located near the object 103 providing an optical focusing characteristic is identified as a Fresnel zone plate 120. However, it should be appreciated that the optical element may be any suitable microfabricated diffractive optical element. For example, in other implementations contemplated by the present invention, the optical element may alternatively comprise a refractive microlens, or may comprise a combination of a refractive and diffractive microfabricated optical element (e.g., a microfabricated binary optical element that may be produced by gray-scale dose exposure of a polymeric resist, by micromolding, or by imprint lithography). In various aspects, the microfabricated optical element provides at least one focusing characteristic. The optical element may provide additional focusing characteristics (e.g., multiple focal spots), as described in international patent application PCT/US2008/011033 to common inventors, filed Sep. 23, 2008, and now published under publication number WO2009/088399 (which publication is hereby incorporated by reference herein in its entirety).

In FIG. 1A, the zone plate 120 may be a microfabricated zone plate having a diameter $d_{zp}$ less than one millimeter. In certain embodiments the diameter of the zone plate is between about 10 microns and about 500 microns, or more concisely between 10 microns and 500 microns. As noted elsewhere, the drawing of FIG. 1A is not to scale, and the zone plate is typically much smaller than the relay optic and located a relatively large distance, as compared with the zone plate diameter, from the relay optic 140. As one non-limiting example, the zone plate 120 may measure about 100 microns in diameter, $d_{zp}$, and the relay optic 140 may be located a distance between about 10 mm and about 200 mm, more particularly between 10 mm and 200 mm, from the zone plate.

Figure 2A:
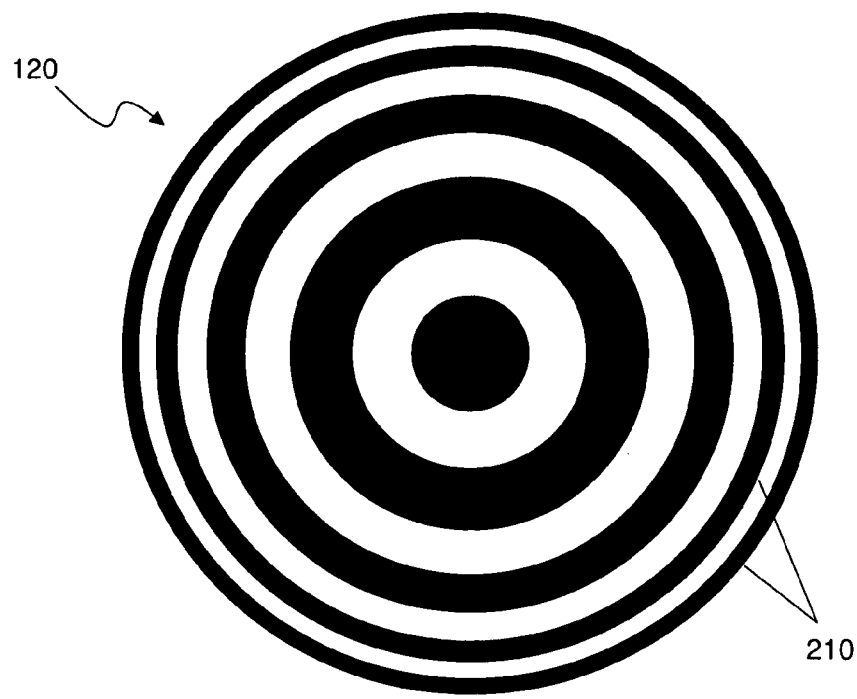
FIG. 2A is a depiction of zone plate for teaching purposes only. The zone plate comprises concentric rings 210 of varying width and spacing.
Figure 2B:
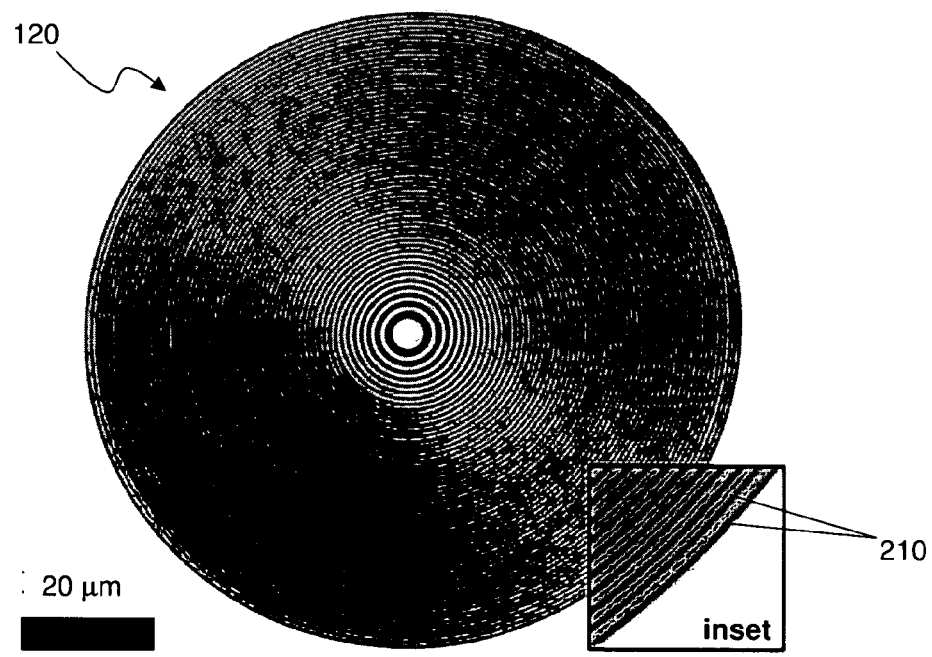
FIG. 2B is a micrograph of an embodiment of a microfabricated Fresnel zone plate. The scale bar indicates the size of the zone plate, and the inset shows portions of the outer rings of the zone plate.

An embodiment of a Fresnel zone plate 120 is comprised of concentric rings 210 of varying width, as depicted in the plan views of FIGS. 2A-2B. FIG. 2A is a rendering depicting a generalized pattern of a zone plate, and FIG. 2B is a micrograph of microfabricated Fresnel zone plate 120. The scale marker shows that the zone plate has a diameter $d_{zp}$ of about 95 microns, about the width of human hair. The inset in FIG. 2B shows the fine outer rings of the zone plate, which measure less than one micron in width.

The rings 210 of the zone plate provide the diffractive and optical focusing characteristic of the zone plate. The focusing characteristic of the zone plate 120 may be characterized, or parameterized, by a focal length f. Generally, the focal length f is regarded as a "free space" focal length for the zone plate. For example, when collimated light impinges on and passes through the zone plate into air, it will come to a focus on an optical axis of the zone plate at a distance f from the zone plate. In FIG. 1A the optical axis of the zone plate is substantially collinear with the optical axis 101. Conversely, when a source of radiation is located at the focus of the zone plate, emitted radiation collected by and passing through the zone plate will be collimated. The zone plate then acts as an optical lens, even though it is a substantially planar device.

The focal length f of the zone plate 120 may be determined by the pattern of the rings 210. In general, ring patterns that have a larger radial periodicity provide a longer focal length, and ring patterns of shorter periodicity yield shorter focal lengths. Thus, one can design the pattern of the zone plate to provide virtually any desired focal length. The zone plate diameter $d_{zp}$ and focal length are related to the numerical aperture (NA) of the zone plate in free space according to the relation:

$$NA = \sin[\tan^{-1}(d_{zp}/2f)]. \qquad \text{EQ. 1}$$

A zone plate may also be characterized by its NA value. Generally, a larger NA value denotes a shorter focal length.

The inventors have recognized that employing zone plates 120 with significantly short focal lengths, or large NA values, can eliminate the need for a pinhole aperture in zone-plate confocal microscopy apparatus 100 as illustrated in FIG. 1A. In exemplary implementations, the numerical aperture of the zone plate 120 may be between about 0.5 and about 3.0, or more particularly between 0.5 and 3.0. The focal length of the zone plate 120 may be between about 0.5 micron and about 10 microns, more particularly between 0.5 micron and 10 microns. It will be appreciated that a zone plate having a significantly large NA may operate as an objective lens in the microscopy apparatus 100 of FIG. 1A; however, the cost of the zone plate can be significantly lower since it can be microfabricated in vast quantities. Additionally, as noted above, the zone plate can be readily altered to provide virtually any value of focal length, or NA, for a particular application.

There is a subtlety in the operation of a zone plate when a material 110 adjacent the zone plate 120 has an index of refraction which differs from the index of refraction for air. In FIG. 1A the focal region is shown to be located a distance less than f from the zone plate 120. This can occur when the light passes through a material 110 having an index of refraction $n_2$ greater than 1, the index of refraction of air. A material 110 having a index of refraction greater than 1 disposed on the zone plate 120 may effectively shorten the focal length of the zone plate. In such a configuration, the NA of the zone plate is also changed; EQ. 1 is changed by multiplying the right side by the value of the index of refraction for the material ($n_2$ for the embodiment shown in FIG. 1A).

In various embodiments, the zone plate 120 is disposed on a substrate 105, which may have a thickness $t_s$. The substrate will transmit at least a portion of the radiation that is emitted from the object 103 and that passes through the zone plate 120. The substrate may have an index of refraction $n_1$ that differs in value from 1.0. In exemplary implementations, the thickness of the substrate 105 may be between about 5 microns and about 20 mm, or more particularly between 5 microns and 20 mm. In some embodiments, the substrate is adapted to exhibit optical filtering characteristics such that it blocks a portion of radiation incident on the substrate 105.

In an alternative embodiment to FIG. 1A, the zone plate 120 may be located on an upper surface of the substrate 105.

In such an embodiments, the thickness of the substrate $t_s$ may be between about one-half and about one-and-one-half the value of the focal length f, or more particularly between one-half and one-and-one-half the value of the focal length f. The material 110 may then be omitted.

The zone plate 120 may be patterned and fabricated using any of a variety of microfabrication techniques. Patterning techniques include, but are not limited to, electron beam lithography, ion beam lithography, contact photolithography, optical projection lithography, x-ray lithography, zone-plate array lithography, imprint lithography, interference lithography, micromolding lithography, and soft lithography. Fabrication techniques include, but are not limited to, lift-off techniques, reactive ion etching, wet chemical etching, material deposition, chemical-mechanical polishing. Any combination of these techniques may be used to fabricate a zone plate 120, a linear array of zone plates, or a two-dimensional array of zone plates.

Figure 3A:
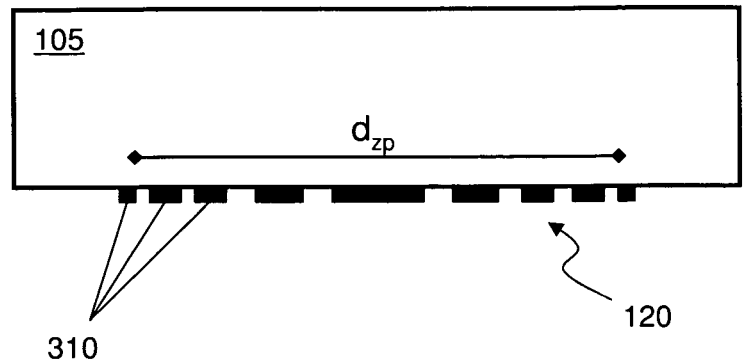
FIGS. 3A-3C depict various embodiments of microfabricated zone plates.
Figure 3B:
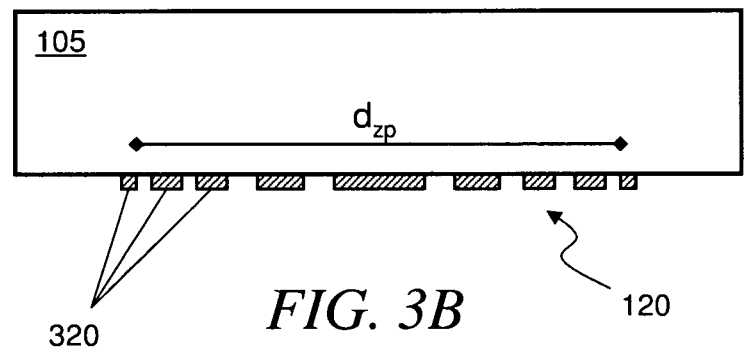

FIGS. 3A-3B depict embodiments of zone plates 120 that may be fabricated by various microfabrication techniques. As an example, FIG. 3A depicts an embodiment in which a zone plate has been patterned in metal 310 on a substrate. For this embodiment, a layer of electron-beam resist (not shown) disposed on the substrate 105 may first be patterned by electron beam lithography. A metal may then be evaporated onto the resist/substrate structure. Subsequent dissolution of the resist in a lift-off process will lift-off the metal except where the metal was evaporated onto the underlying exposed substrate. Although electron beam lithography is described for this embodiment, alternative forms of lithography may be used, (e.g., ion beam lithography, photolithography, contact printing, imprint lithography). It will be appreciated that various types of lithographic processes may be used to pattern the zone plates in this and the following described embodiments.

Figure 3C:
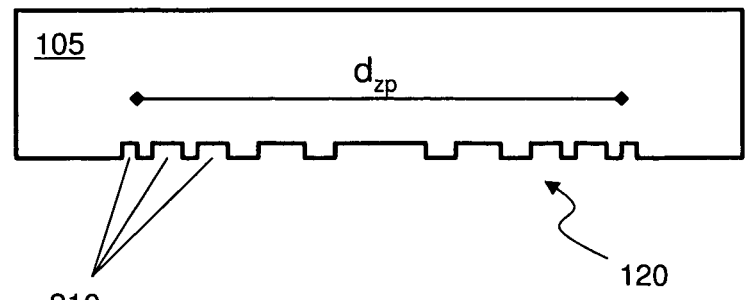

FIG. 3B depicts an embodiment in which the zone plate has been patterned in an amorphous silicon material 320. In this embodiment, the amorphous silicon material may first be deposited onto the substrate 105 and covered with a photoresist layer (not shown). The photoresist layer may be patterned using contact photolithography in which all the photoresist is exposed except for the rings of the zone plate. The structure may then be subjected to reactive ion etching that removes all the amorphous silicon, except where covered by the photoresist. The photoresist may then be removed, leaving the zone plate's rings. FIG. 3C depicts an embodiment in which the zone plate has been formed in the substrate 105. The rings 210 of the zone plate are defined topographically in the substrate. This embodiment may employ soft lithography, in which the substrate 105 comprises a soft polymer, e.g., polydimethylsiloxane (PDMS). The PDMS may be poured over a mold, e.g., the structure formed in FIG. 3A, cured, and subsequently peeled off to yield the embodiment of FIG. 3C. Other methods by which the zone plate 120, or arrays of zone plates, may be fabricated will be known to those skilled in the art of microfabrication.

For the embodiment depicted in FIG. 3A, the metal 310 may be selected to block most or all radiation incident on the metal. For the embodiments of FIG. 3B, the material 320 may be selected to attenuate and/or provide a desired phase shift to radiation incident on the material 320. The material 320 may be selected to have a high index of refraction, e.g., greater than a value of about 2.0. When the materials index of refraction is high, the thickness of the material is reduced for a desired phase shift. This can result in easier microfabrication steps, e.g., a shorter reactive ion etching step to etch the zone plate pattern. The desired phase shift may be one-half of a wavelength of the radiation which is detected by the detector, or $\pi$ radians. In some embodiments, the desired phase shift may be between one-quarter and three-quarters of a wavelength, more particularly between $\pi/2$ and $3\pi/2$ radians.

Referring again to FIG. 1A, a layer of material 110 may be disposed on the zone plate 120. The layer of material 110 may comprise a liquid-borne polymer which has been spin-coated onto the substrate 105 and subsequently baked or cured. The layer may comprise an inorganic material, e.g., $SiO_x$, which has been deposited or grown by physical or vapor deposition. The layer of material 110 may comprise, in some embodiments, a film of material which is applied to the substrate 105 and adheres to the substrate, e.g., a thin film of polymeric material which adheres by surface interaction to the substrate. In various embodiments, the layer of material 110 transmits at least a portion of radiation passing through the zone plate. In some embodiments, the layer of material 110 may be adapted to exhibit optical filtering characteristics, e.g., blocking at least a portion of radiation incident upon the material 110.

The layer of material 110 can serve several functions. First, the layer of material can protect the zone plate from damage or picking up particles that may interfere with the optical properties of the zone plate. Any particles that may be picked up by the zone-plate structure may be readily cleaned from the surface of the material 110 without risk of damaging the zone plate 120. The layer of material 110 may also function as a "solid immersion" material, i.e., a material with a higher index of refraction than air that effectively shortens the focal length of the zone plate and increases the zone plate's NA. Additionally, the layer of material 110 may provide a boundary proximal the zone plate's focal region that can assure that an object will be located at the effective focal distance from the zone plate. This can facilitate positioning of the object in the zone plate's focal region.

The object 103 to be inspected may be located approximately at the focal region of the zone plate 120, as illustrated in FIG. 1A. The object 103 may comprise any object desired to be inspected with a microscope. The object 103 may be any type of microparticle, e.g., a small manufactured particle such as a bead or colloidal particle, or a biological specimen, e.g., a cell, a protein, a nucleic acid, a virus, a peptide, a small molecule, etc. The object may be fluorescent, or it may be fluorescently labeled. The object 103 may be a component of an assay, e.g., a component or an agglomerated particle used to detect the presence of an analyte, or it may be a component of an assay used to detect an effect of a pharmaceutical agent.

The relay optic 140 may comprise any optic that relays an image of the zone plate 120 onto the detector 150. The image may be in focus, or out of focus at the detector. As one example, the relay optic may comprise a single refractive optical lens positioned between the zone plate 120 and the detector 150. As a further example, the relay optic may comprise a pair of refractive optical lenses. The relay optic may comprise a unity magnification telescope. In some implementations, the relay optic 140 may comprise a diffractive optical element and/or a binary optical element, or a combination of either or both of these optical elements and one or more refractive lenses. The relay optic 140 may function essentially as a pinhole aperture for the imaging system, and may have a suitable size (e.g., a one-inch diameter, a one-half-inch diameter, a two-inch diameter, or any other suitable size) selected so that the relay optic operates essentially as a pinhole aperture. To operate as a pinhole aperture, the relay optic 140 excludes unwanted radiation, travelling from the object 103, from the detector 150.

In various embodiments, the relay 140 optic has a numerical aperture with a value less than the numerical aperture of the zone plate 120. The NA of the relay optic may have a value between about 0.01 and about 0.5, more particularly between 0.01 and 0.5. In some embodiments, at least one lens of the relay optic has an NA value between about 0.01 and about 0.5, more particularly between 0.01 and 0.5. In various implementations, the relay optic 140 accepts a portion of radiation that is emitted from the object 103 and collected by the zone plate 120. It will be appreciated that selecting a relay optic 140 with a small NA will exclude radiation travelling from the zone plate 120 at angles with respect to the optical axis 101 that exceed the acceptance angle of the small NA relay optic 140.

Figure 4:
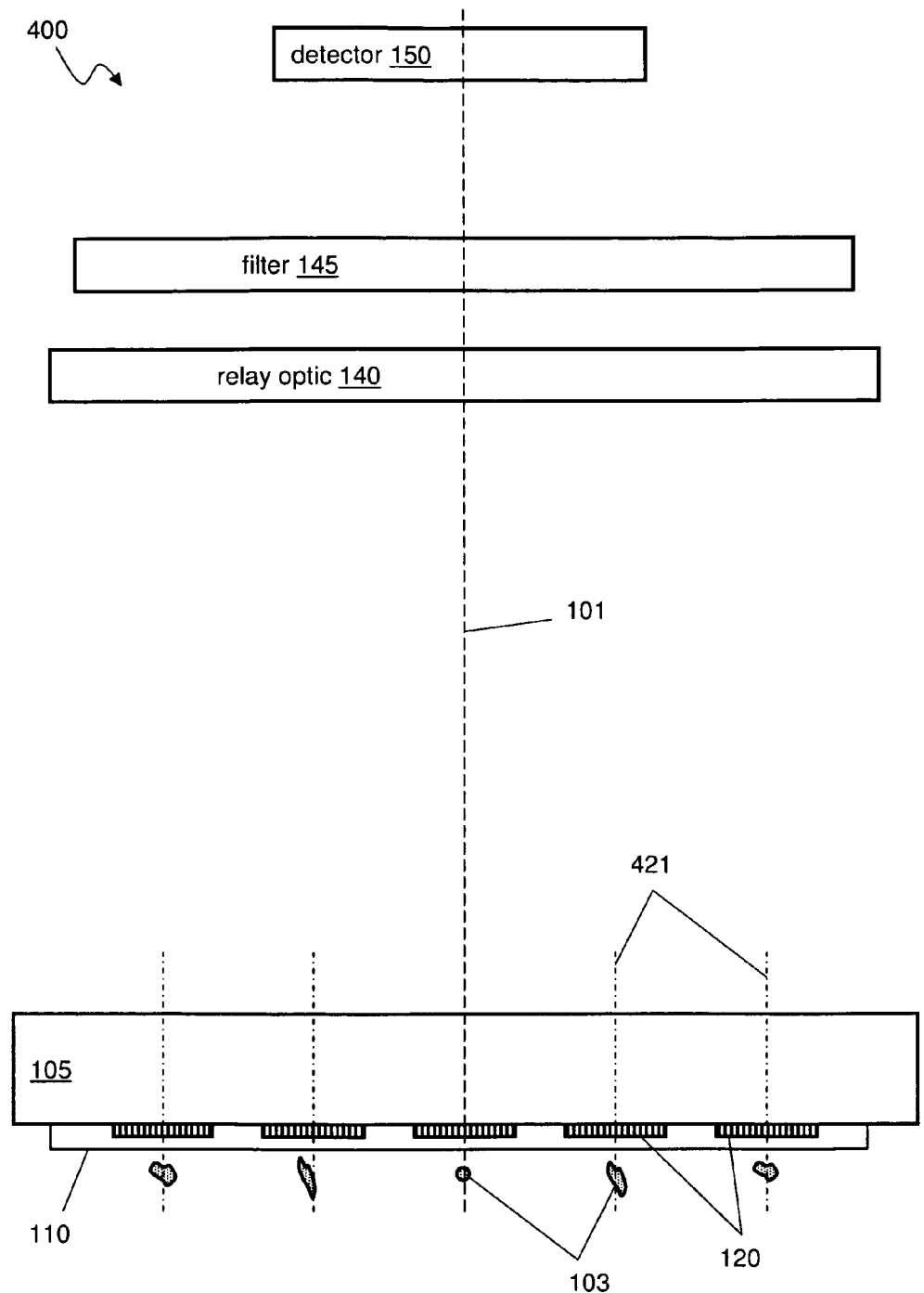
FIG. 4 illustrates an embodiment of a zone-plate microscopy system having a plurality of zone plates and a single relay optic, which may be used for parallel inspection of plural objects 103.

In various embodiments, the relay optic 140 is aligned substantially centrally with an optical axis of the zone plate 120. Referring to FIG. 1A, an optical axis of the relay optic 140 and an optical axis of the zone plate 120 are aligned to be substantially collinear with the optical axis 101 shown for the apparatus 100. For embodiments in which a plurality of zone plates 120 are used, the optical axis of the relay optic 140 may be aligned centrally with the optical axes of the plurality of zone plates (i.e., to be aligned centrally, the optical axis of the relay optic may be aligned to be substantially parallel with and geographically centered among the optical axes of the plurality of zone plates). An example embodiment including a plurality of zone plates and a centrally aligned relay optic is illustrated in FIG. 4.

An optical filter 145 may be disposed between the object 103 and the detector 150 and be any type and form of optical filter, e.g., an interference filter, an optical density filter, a polarizing beam splitter, a pellicle, etc. In some embodiments, more than one filter may be used. The optical filter 145 may be selected to block a portion of radiation directed toward the detector. For example, the filter may block radiation longer than a selected wavelength, shorter than a selected wavelength, or within a wavelength band. The blocked radiation may be radiation that would otherwise contribute to background signal or noise in the detector. As an example, the filter 145 may block ambient light. The filter 145 may be used in certain embodiments to block excitation radiation that is used to excite fluorescent radiation emitted from the object 103.

The filter 145 may be located at various positions in the apparatus 100. It may be located within the relay optic 140, before or after the relay optic, incorporated with the detector 150, or incorporated with the zone-plate structure, e.g., incorporated with the substrate 105 or material 110, in some embodiments. In certain implementations, the apparatus 100 may omit the filter, e.g., when illumination radiation scattered from the object 103 is being detected.

A detector 150 may be used with the zone-plate microscopy apparatus 100 to detect a level of radiation emitted from the object 103 and provided to the detector by the zone plate 120/relay optic 140 combination. The detector may be any type and form of detector that is responsive to radiation from the object 103, the radiation being desirable to detect. For example, the detector 150 may be responsive to fluorescent radiation emitted from the object 103. In some embodiments, the detector 150 may be responsive to illumination radiation emitted from the object 103, the illumination radiation scattered by the object. The detector may comprise a photodetector, an array of photodetectors, e.g., a CCD array. The detector 150 may comprise a photomultiplier, an avalanche photodiode, a CMOS photodetector, or an array of any of these types of detectors.

Figure 1B:
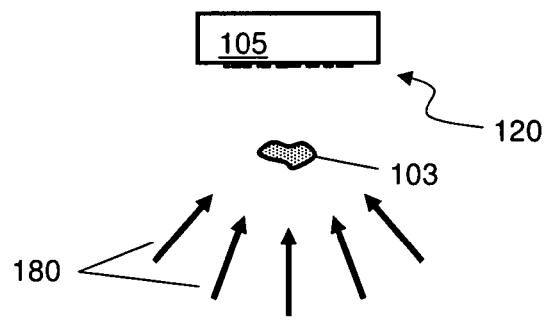
FIGS. 1B-1C illustrate illumination of an object 103 to be inspected or imaged according to various embodiments of the present invention.
Figure 1C:
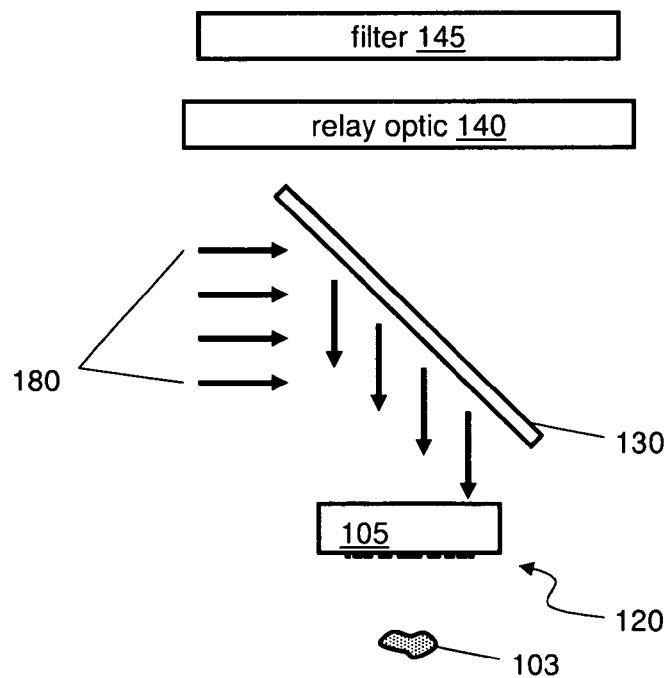

An object 103 to be inspected or imaged may be illuminated in any suitable manner. For one embodiment, the object may be illuminated by illumination or excitation radiation 180 generally from a side opposite the zone plate 120, as illustrated in FIG. 1B. In another embodiment, the object 103 may be illuminated generally from a same side on which the zone plate is located, as illustrated in FIG. 1C. For the embodiment shown in FIG. 1C, the zone plate may focus the illumination or excitation radiation 180 onto the object 103. A beamsplitter, dichroic mirror, or polarizing beamsplitter 130 may be used to direct at least a portion of the illumination radiation 180 onto towards the object 103 and to pass at least a portion of radiation emitted (not shown) from the object to the relay optic 140 and/or detector 150 (not shown). The beamsplitter 130 may be located as shown in FIG. 1C, or alternatively may be located at any position between the relay optic 140 and detector 150.

In one exemplary implementation, the zone-plate microscopy apparatus 100 may sense and record radiation emitted from an object 103 in the following way. Radiation emitted from the object 103 generally will radiate in all directions. The radiation emitted from the object may be fluorescent radiation or may be illuminating radiation scattered by the object. In some implementations, it may be desirable to detect fluorescent radiation, while in other implementations it may be desirable to detect scattered illuminating radiation. A portion of the emitted radiation will be collected by the zone plate 120 and directed generally towards the relay optic 140. Some of the radiation collected by the zone plate 120 will travel toward the relay optic at an angle with respect to the optical axis 101 that falls within an acceptance angle of the relay optic 140. The acceptance angle of the relay optic is determined by the NA of the relay optic. Radiation collected by the zone plate 120 and travelling toward the relay optic at an angle within the acceptance angle of the relay optic 140 will be relayed to and detected by the detector 150. All other radiation will be excluded from detection.

The inventors have recognized that by using a relay optic with a small NA value and a zone plate with a large NA value, off-axis and out-of-focus radiation emitted from the object 103 can be excluded from detection without using a confocal pinhole aperture in the apparatus 100. This aspect of operation is described in further detail below. The inventors have recognized that the combination of NA values, for the zone plate 120 and for the relay optic 140, can be selected to limit detected radiation to be that which is emitted substantially from only within the focal region of the zone plate 120. The apparatus 100 may then be used to detect radiation from a microscale region without the use of a pinhole aperture. The apparatus 100 may also be used for high-resolution imaging, by moving the object 103 with respect to the zone plate 120 and recording a sequence of detected light levels corresponding to each movement step of the object. High-resolution imaging may be carried out in two dimensions, by moving the object 103 transverse to the optical axis 101 (i.e., in an X-Y plane), or alternatively in a direction along the optical axis (i.e., in a plane containing the Z axis), in a raster-scanning method. Three-dimensional imaging may also be obtained by systematically scanning the object in all three dimensions (e.g., recording a series of X-Y images at sequential Z positions).

The operation of the apparatus 100 may also be described as follows. By using a relay optic with a small NA value, the "field of view" of the zone plate is restricted to a small area, an area having a width on the order of the size of the focal region of the zone plate. As used herein, "focal region" refers to a small volume at the effective focus of the zone plate that would be substantially filled by a diffraction limited focal spot. Expressed alternatively, the focal region refers to the spot focus that results when a uniform beam of monochromatic radiation impinges normally on the zone plate. The focal region may also be expressed as a surface which bounds the full-width-half-maximum value of the diffraction limited focused radiation.

Multiple different combinations of respective NA values for the relay optic 140 and the zone plate 120 are contemplated according to various embodiments of the present invention. For example, in some implementations, the inventors have found that the combination of NA values for the relay optic and the zone plate can be selected for some embodiments to yield a field of view for the apparatus 100 between about 200 nanometers and about 2 microns, more particularly between 200 nanometers and 2 microns. As a non-limiting example, if a zone plate has a diameter of about 50 microns and a $NA_{zp}$ of 0.9, and the relay optic has an $NA_{ro}$ of 0.05, the field of view will be about 1 micron. In other implementations, the combination of NA values for the zone plate and relay optic may be selected to yield a field of view for the apparatus between about 100 nanometers and about 500 nanometers, more particularly between 100 nanometers and 500 nanometers. As a non-limiting example, if a zone plate has a diameter of about 40 microns and a $NA_{zp}$ of 0.95, and the relay optic has an $NA_{ro}$ of 0.025, the field of view will be about 300 nanometers. Other combinations of NA values and zone plate design to yield different field of views will be evident to those skilled in the art of optics from the foregoing and following description (e.g., in view of EQS. 6-7).

When a layer of material 110 is disposed on the substrate 105 having a thickness $t_p$ approximately equal to, or equal to, the effective focal length of the zone plate 120, the object 103 may be positioned on or adjacent the layer of material 110 and moved with respect to the zone plate. For example, the object 103 may be disposed on the material 110 and moved transverse (i.e., in the X and Y directions) to map out an image of the object. If the zone plate is located on one side of the substrate 105, and the substrate thickness $t_s$ is approximately equal to, or equal to, the effective focal length of the zone plate 120, the object 103 may be positioned adjacent the substrate on the side opposite the zone plate and moved in a similar manner to image the object. The act of moving the object 103 with respect to the zone plate 120 may comprise moving the object wherein the zone plate structure remains fixed, or may comprise moving the zone plate structure wherein the object remains fixed.

In some embodiments, the object 103 may be disposed in a fluid and positioned adjacent the layer of material 110 (or adjacent to the substrate 105 when the substrate is below the zone plate). The fluid may be fluid in a microfluidic channel or microfluidic chamber that brings the object into close proximity with the layer of material 110, or substrate 105. The fluid may be in contact with the material 110, or substrate 105. The fluid may convey the particle in a microfluidic stream through the focal region of the zone plate.

The inventors have recognized and appreciated that parallel confocal microscopy may be performed using apparatus similar to that shown in FIG. 1A, but including an array of microfabricated optical elements, e.g., Fresnel zone plates 120 having short focal lengths. An exemplary apparatus according to one embodiment is depicted in FIG. 4. As can be seen in the drawing, only a single relay optic 140 is used and operates as a pinhole aperture for all the zone plates in the array. In some embodiments, each microfabricated optical element may be imaged by the relay optic onto a different part of a detector 150. In some embodiments, the detector 150 may be an image sensor, e.g., a CMOS imaging CCD array. Thus, in some exemplary implementations, a single camera may be used to operate hundreds or thousands of zone-plate-based microscopes simultaneously. In various embodiments, the short focal length lenses of the array may not have overlapping fields of view. As can be seen in the drawing, the relay optic 140 may be aligned centrally with the optical axes 421 of the plurality of microfabricated optical elements in the array.

There are several advantageous aspects of the present invention. Among these are advantages related to high-resolution imaging utilizing a plurality of microfabricated optical lenses, as depicted in FIG. 4. In various implementations, a combination of NA values for the microfabricated optical lenses 120 and the relay optic 140 are selected such that the fields of view for the lenses/relay optic combination are non-overlapping. Such a combination of NA values can reduce unwanted signal from neighboring or adjacent lenses, and also permit operation of the confocal microscopy apparatus without a pinhole aperture or without an array of pinhole apertures.

Further details of operation of a zone-plate-based microscopy apparatus 100 will now be presented. These details include discussions of focal length, magnification, and wavefront tilt. A theoretical treatment is also provided for heuristic purposes. Although the following and preceding description is directed primarily to a zone-plate-based microscopy apparatus, it will be appreciated that other types of integrated optical elements exhibiting short focusing characteristics are contemplated, as described elsewhere herein, and can be similarly analyzed and used in the microscopy apparatus.

Theoretical Discussion

Regarding respective NA values for a microfabricated optical element such as a Fresnel zone plate and a relay optic used in combination in an imaging apparatus according to embodiments of the present invention, in various non-limiting examples the NA of the zone plate may be larger than the NA of the relay optic by a factor of 2, a factor of 5, a factor of 10, a factor of 20, a factor of 50, or a factor of 100 in some embodiments. At large values of NA, the zone plate may be configured in the apparatus 100 to produce a large magnification M. The magnification may be between about 1,000 and about 100,000, more particularly between 1,000 and 100,000. In some implementations, the magnification is greater than 100,000. As an example, in some embodiments the zone plate 120 produces a magnification of 20,000. This is a significantly large magnification for a conventional microscope, but readily achievable with the zone-plate-based apparatus 100. At such a large value of magnification, a small shift of 500 nm in the plane of the object 103 will result in a shift in the image plane of 1 cm. If the size of the relay optic 140 is 2 cm in diameter, roughly one inch, any radiation emitted from the object 103 at a distance of about 500 nm or more from the optical axis 101 will be essentially shifted out of the aperture of the relay optic 140.

It should also be appreciated that the magnification M for the zone plate can be calculated as a ratio of image distance $d_i$ to object distance $d_o$, where both distances are measured from the zone plate: $M = d_i / d_o$. In some embodiments, the object 103 may be placed at the effective focus of the zone plate, in which case the object distance becomes $d_o = f_{eff}$ and the image distance tends to infinity, $d_i \to \infty$. Thus, the magnification may take on very large values by designing the apparatus 100 to have very short focal lengths and placing the object 103 near or at the effective focus of the zone plate 120.

When the product $M \times \Delta x$ is selected to be on the order of one inch, where $\Delta x$ represents the free space diffraction limit (which is roughly around 500 nm for optical frequencies), a one-inch-diameter relay optic can operate as a pinhole with diffraction limited resolution for an entire array of short focal length optical elements (e.g., an array of short focal length zone plates), each having a magnification M. In some embodiments, a magnification M of 20,000 may be desired. Thus, the focal length f may be 5 μm or less, which may be about 10 wavelengths (10λ) of optical radiation.

It may be appreciated from the foregoing discussion that selecting a combination of zone plate magnification and relay optic size can determine the field of view of the microscopy apparatus 100 when the magnification is large, e.g., greater than 1,000. If the diameter of the relay optic 140 is denoted as $\phi_{ro}$, then the field of view FOV can be determined, in some implementations, from the following relation:

$$FOV \approx \phi_{ro} \div M \qquad \text{EQ. 2}$$

When the focal length of the zone plate is very short, e.g., less than 100 μm, the zone plate produces a significant degree of wavefront deviation for radiation coming from only small distances from the optical axis 101. Light originating outside the apparatus' field of view may experience significant wavefront tilt, as well as higher order aberrations, and consequently is not collected by the low numerical aperture relay optic. Such off-axis radiation is substantially and in some instances completely excluded from the detector 150. Similarly, radiation originating from along the optical axis 101 but away from the focal region will also be excluded from the detector 150.

Fresnel zone plates comprise diffractive lenses that may have significantly short focal lengths (e.g., focal lengths less than 50 microns, less than 20 microns, less than 10 microns, and less than 5 microns in some implementations, or between about 0.5 micron and about 50 microns, more particularly between 0.5 micron and 50 microns). In one illustrative interpretation, a zone plate can be considered to be a thin hologram where the reference wave is a plane wave and the recorded wave has the phase of a spherical wave originating from a point at a focal length away. The complex field of the hologram H is the interference of the reference and recorded wavefronts, $$H(r) = |1 + \exp(-jk_n\sqrt{r^2+f^2})|^2 \qquad \text{EQ. 3a}$$

from which $$H(r) = 2 + \exp(jk_n\sqrt{r^2+f^2}) + \exp(-jk_n\sqrt{r^2+f^2}) \qquad \text{EQ. 3b}$$

where r is the radial coordinate, $k_n$ is the wave-vector in the focusing medium, and f is the focal length. The continuous valued interference pattern can be encoded into a binary phase zone plate using a threshold condition. High NA binary zone plates produce only two focal spots; one at f, the other at −f, because higher orders are evanescent. The focal length f may be as short as a few optical wavelengths, or even zero in surface plasmon structures.

Figure 5:
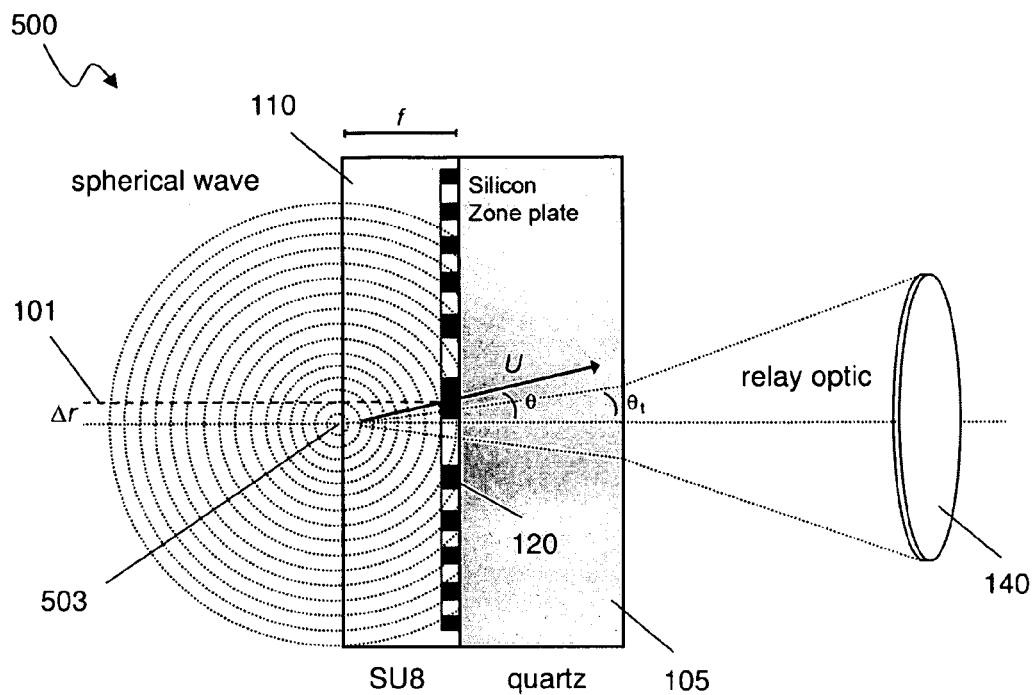
FIG. 5 depicts an embodiment of the zone-plate microscopy system of FIG. 1A in which a point source, displaced a small distance dr from the optical axis, emits a spherical wave that impinges on the zone plate.

A "collection region" of an imaging apparatus comprising a significantly short focal length zone plate and a relay optic (e.g., similar to that shown in FIG. 1A) may be described based on operating the zone plate in a collection mode, in which the zone plate is illuminated by a spherical wave point source 503, as illustrated in FIG. 5. In this case, the amplitude of the spherical wave should not be dropped, as it plays a role in defining the field U=H×S emerging from the zone plate.

$$U = [2 + \exp(jk_n\sqrt{r^2+f^2}) + \exp(-jk_n\sqrt{r^2+f^2})] \times \frac{A_0}{\sqrt{r^2+f^2}} \exp(-jk_n\sqrt{r^2+f^2}) \qquad \text{EQ. 4a}$$

from which is derived $$U = \frac{A_0}{\sqrt{r^2+f^2}} + \ldots \qquad \text{EQ. 4b}$$

where S is the complex field of a point source and $A_0$ is its amplitude. As can be seen from the foregoing, the zone plate collimates the point source by cancelling the spherical phase, but the field is not uniform in amplitude. This is analogous to a collection apodization factor (See T. D. Visser, G. J. Brakenhoff, F. C. A. Groen, "The one-point fluorescence response in confocal microscopy," *Optik*, 87, 39 (1991)). Other interference terms have been dropped from EQ. 4b, as noted by the ellipsis. The intensity of the wave emerging from the zone plate $|U|^2$ is Lorentzian and has a full width at half maximum of 2f. For large NA zone plates that have an aperture much larger than their focal length, this width can be significantly smaller than their physical aperture.

When the point source 503 is located on the optical axis 101, the field collimated by the zone plate has a flat phase distribution and consequently no wavefront tilt. A transverse displacement Δr of the point source produces a wavefront tilt with an angle of θ=arctan(Δr/f). In an imaging apparatus similar to the microscopy apparatus 100 shown in FIG. 1A, a portion of the field emerging from the zone plate is collected by a low NA relay optic that has a maximum collection angle $\theta_r$. When $\theta > \theta_r$, light collected by the zone plate is not captured by the telescope and therefore does not hit the detector. This is an extreme form of "vignetting" which restricts the zone plate field of view and is enhanced by the zone plate's short focal length (For a discussion of vignetting with microlens arrays, see H. J. Tiziani, R. Achi, R. N. Kramer, and L. Wiegers, "Theoretical analysis of confocal microscopy with microlenses," *Appl. Opt.* 35 120 (1996)). Vignetting can occur when when the following condition is satisfied.

$$\Delta r \approx f \tan \theta_r \qquad \text{EQ. 5}$$

An expression for the field of view of the microscopy apparatus 100 can be obtained from EQ. 5, expressed in terms of the zone plate's focal length f and the relay optic's numerical aperture $NA_{ro}$. Taking 2Δr to be the field of view, and assuming that the numerical aperture of the relay optic is small in value, e.g., less than about 0.1, the field of view can be expressed as follows:

$$FOV \approx 2f \times NA_{ro} \qquad \text{EQ. 6}$$

The field of view may also be expressed in terms of the zone plate diameter $d_{zp}$ and numerical apertures of the zone plate $NA_{zp}$ and relay optic $NA_{ro}$ as follows:

$$FOV \approx d_{zp}\sqrt{2\left(1 - \frac{NA_{zp}}{n}\right)} \times NA_{ro}. \qquad \text{EQ. 7}$$

This relation holds when the zone plate's focal length f is significantly less than its diameter $d_{zp}$ (i.e., $f \ll d_{zp}$).

In view of EQ. 6 and EQ. 7, it will be appreciated that the field of view of a zone-plate-based apparatus can be determined in a design phase by selecting a value for the zone plate's focal length f, or effective focal length, and a value of the relay optic's numerical aperture $NA_{ro}$. It will also be appreciated that a variable aperture, e.g., an optical iris, may be placed between the relay optic and the zone plate to provide for adjustability of a zone-plate-based microscope's field of view. For example, the variable aperture may be located at the entrance of the relay optic.

Description of Methods

Figure 6:
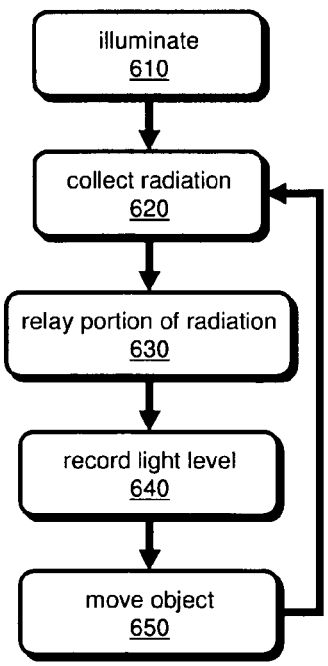
FIG. 6 represents a flow diagram of an exemplary method for zone-plate-based microscopy according to one embodiment of the present invention.

It should be appreciated that various inventive methods according to the concepts described herein may be carried out with the apparatus described above. An exemplary method of zone-plate-based microscopy according to one embodiment of the present invention is depicted in the flow chart of FIG. 6.

In a particular implementation, a method for optically inspecting an object may comprise illuminating 610 an object, collecting 620 a portion of radiation emitted from the object (e.g., radiation reflected/scattered from the object, excited fluorescence) with at least one microfabricated Fresnel zone plate, and relaying 630 at least a portion of the collected portion of radiation with a relay optic configured to operate as a confocal pinhole aperture for the at least one zone plate. In some embodiments, the method may further comprise recording 640 a light level of the radiation relayed by the relaying optic with a detector 150. In some embodiments, the method may further comprise moving 650 the object 103 and repeating steps of collecting 620, relaying 630, and recording 640. The steps 620-650 may be repeated under constant illumination or under pulsed illumination, in which case all steps would be repeated. The iteration of the steps may be carried out to create a two-dimensional or three-dimensional image of the object 103. Alternatively, single-shot measurements, using steps 610-640 may be carried out on an object to obtain a single light-level reading for the object.

The step of illumination 610 may comprise illumination an object with any suitable wavelength and intensity of radiation. The radiation may be in the infrared wavelength band, visible wavelength band, ultraviolet or deep ultraviolet wavelength band. The illumination radiation may be coherent radiation, e.g., radiation from a laser, partially coherent, or incoherent radiation. The step of illuminating may comprising providing polarized or unpolarized illumination radiation. Polarized radiation may be polarized in any manner, e.g., linear, elliptical, or circular. The step of illuminating 610 may comprise exciting fluorescence in the object, whether a property of the object itself or a fluorescing component added to the object or bound to the object. The fluorescent radiation emitted from the object may be the radiation desired to be detected by detector 150 in some embodiments. In other embodiments, the step of illuminating 610 may comprise scattering illumination radiation from the object 103, the scattered radiation desired to be detected by the detector 150. In some embodiments, the step of illuminating 610 may comprise both exciting fluorescence and scattering illumination radiation. Both fluorescent and scattered radiation from the object may be detected using time-division multiplexing or wavelength-division multiplexing detection methods. The step of illuminating 610 may or may not comprise focusing the illumination radiation onto the object 103. A separate focusing optic may be used to focus illumination radiation onto the object 103 in some embodiments, e.g., a lens located beneath the object opposite the zone plate. (See, for example, FIG. 1B.) In some implementations, the illuminating radiation is provided through the zone plate, which may focus the illuminating radiation onto the object 103. (See, for example, FIG. 1C.)

The step of collecting 620 a portion of radiation emitted by the object may be carried out by a microfabricated zone plate or microfabricated optical element located proximal to the object. The zone plate may be disposed on a substrate, e.g., patterned on an optically-transmitting substrate, and exhibit a focusing characteristic characterized by a focal length. The focal length of the zone plate or optical element may be between about 0.5 micron and about 50 microns, more particularly between 0.5 micron and 50 microns. In some embodiments, the focal length of the zone plate or optical element may be between about 0.5 micron and about 10 microns, more particularly between 0.5 micron and 10 microns. The zone plate or optical element may be located between about one-half and one-and-one-half focal lengths from the object.

The relaying 630 may comprise directing a first portion of the portion of radiation collected by the zone plate to the detector 150, and excluding a second portion of the portion of radiation collected by the zone plate from the detector. The directing and excluding may be carried out by a low-NA relay optic. The step of relaying 630 may further comprise positioning the relay optic, e.g., aligning the optical axis of the relay optic to the optical axis of the zone plate, or aligning the optical axis of the zone plate to the optical axis of the relay optic.

The step of recording 640 may comprise recording a data signal representative of at least one light level from the zone plate detected by detector 150. The data signal may be recorded in computer-readable storage media. As an example, the detector 150 may be interfaced with a computer or processor (not shown in the figures) that repeatedly records data signals from the detector. The data signals may be plotted to show a time evolution of detected radiation from an object. When the object 103 is moved or scanned with respect to the zone plate, the data signals may be plotted to provide a two- or three-dimensional image of the object. Accordingly, the step of recording may further comprise displaying at least one signal representative of the at least one light level detected by the detector 150.

It will be appreciated that when an array of optical elements or zone plates 120 are used, the step of recording 640 may comprise recording a plurality of data signals representative of light levels from each of the zone plates in the array. In an embodiment employing an array of zone plates, a detector having an array of optical detectors may be used, e.g., a one- or two-dimensional CCD array. In some embodiments, one pixel in the array of photodetectors may correspond to one zone plate in the array, e.g., receive radiation predominantly from the corresponding zone plate. In some embodiments, a group of pixels in the array of photodetectors may correspond to one zone plate in the array. A computer or processor may then record light data signals associated with each of the zone plates and their corresponding object 103 in the array. The step of recording 640 may further comprise recording separately, as well as displaying separately, data signals representative of light levels from each of a plurality of objects 103.

The step of moving 650 the object may comprise changing the location of the object 103 with respect to the zone plate 120. The object or the zone plate structure may be positioned using micropositioning or nanopositioning equipment. In some embodiments, the object 103 may be disposed in a fluid, and the step of moving 650 comprises grasping and moving the object with optical tweezers. In some embodiments, the step of moving 650 comprises providing the object in a microfluidic channel and controlling fluid flow in the channel to move the object through the focal region of the zone plate 120.

EXAMPLE 1

Zone Plate Fabricated from Silicon

In this example, a high resolution scanning confocal microscope is demonstrated for which the clear aperture of a relay optic operates as a confocal pinhole aperture. Interestingly, although the clear aperture of the relay optic has a diameter of approximately 0.5 inch, the combination of the relay optic with a zone plate having a short focal length results in a sub-micron optical collection region, i.e., a sub-micron field of view for the system. In this example, a short focal length zone plate 120 is scanned over an object 103, and the light that it collects is relayed onto a detector 150. This system offers high collection efficiency and high resolution. In an extension of this scheme, parallel scanning microscopy using a Fresnel zone plate array would require only a single relay optic, rather than an array of pinholes.

To demonstrate this imaging technique, a solid immersion zone plate with an aperture diameter of 50 µm and a focal length of 5 µm has been fabricated. The NA is 1.55 and its maximum focusing cone angle is 78.7°. The zone plate is patterned from a 120 nm amorphous silicon film using electron beam lithography and reactive ion etching. A film of SU8 resist, which acts as the solid immersion medium, is spin coated onto the zone plate and substrate to provide a thickness of 5 µm. The film has a refractive index of 1.58 at a wavelength of 575 nm. For a thickness of 120 nm, the amorphous silicon provides a phase shift of $\pi$ between the silicon rings and the open areas, which are filled with SU8. FIG. 2B shows a scanning electron micrograph (SEM) of the fabricated zone plate. The transmission coefficient of the silicon film at a wavelength of 575 nm is measured to be 0.26 due to both absorption and reflection.

In order to experimentally characterize the microscope, fluorescent spheres of different sizes are scanned across the microscope's field of view. An optically trapped fluorescent sphere used in this manner can provide a measure of the relative collection efficiency of the zone plate microscopy system as a function of distance from the optical axis 101. The measured collection efficiency fits well with numerical simulations that predict a sharply peaked collection region with a lateral extent of 520 nm.

The spheres are disposed in water that is in contact with the layer of material 110, for this example comprising SU8. One of the spheres is selected and optically trapped and pinned against the SU8/water interface using a counter-propagating infrared laser with a free space wavelength of 976 nm. After the sphere is pinned to the SU8 surface, the zone plate is scanned by a piezo motor and positioning apparatus. When the zone plate is centered directly over the sphere, the collection efficiency reaches a maximum. As the zone plate is scanned away from central alignment with the sphere, the collection efficiency quickly decreases, as evidenced by a drop in detected radiation. The drop in radiation maps out the field of view for the microscope, i.e., the region of high collection efficiency. In this example, the back aperture of the zone plate is imaged with unity magnification using a two lens telescope onto a CCD camera. The lenses have focal lengths of 100 mm and diameters of one inch. The clear aperture diameter of these lenses is estimated to be approximately 0.5 inch due to occlusion of the mount, giving an NA of 0.063. A group of CCD pixels receiving radiation from the zone plate are then integrated to give the total collection signal.

Figure 7A:
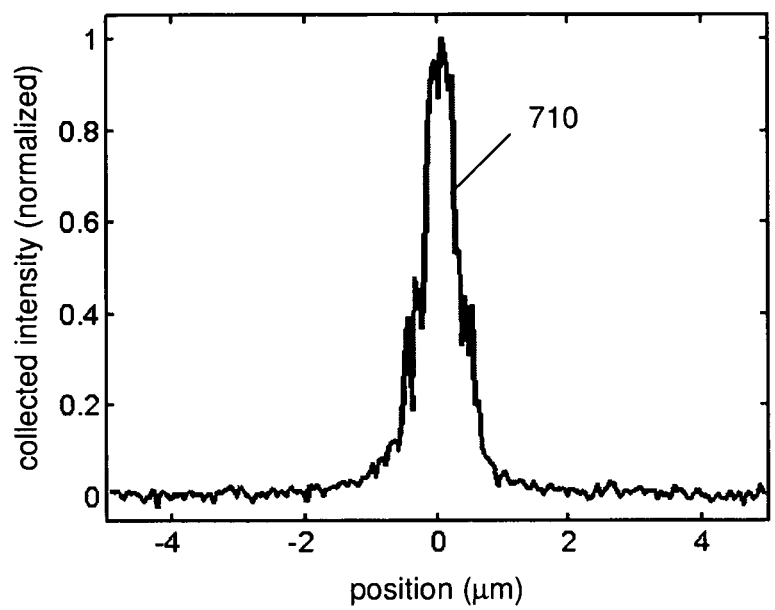
FIGS. 7A-7C are graphs of collected fluorescent signals as a function of transverse displacement Δr of fluorescing spheres for one example embodiment of a zone-plate microscopy system.
Figure 7B:
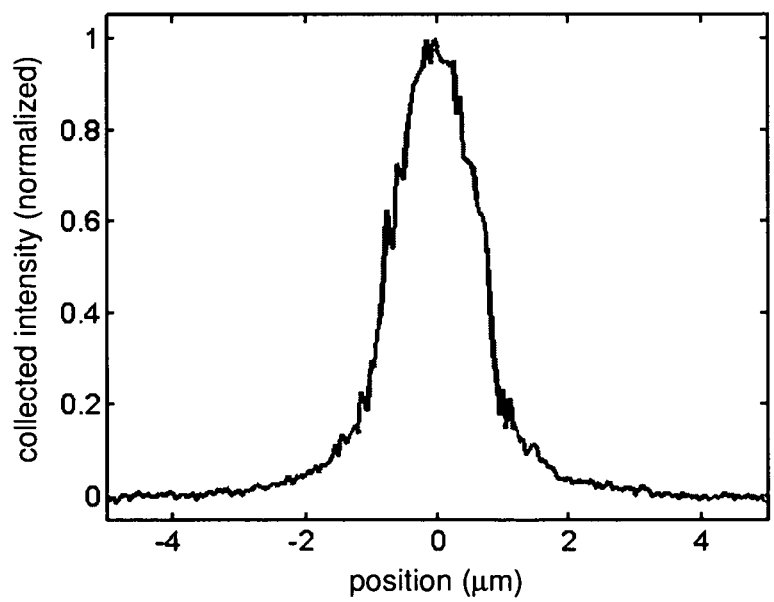
Figure 7C:
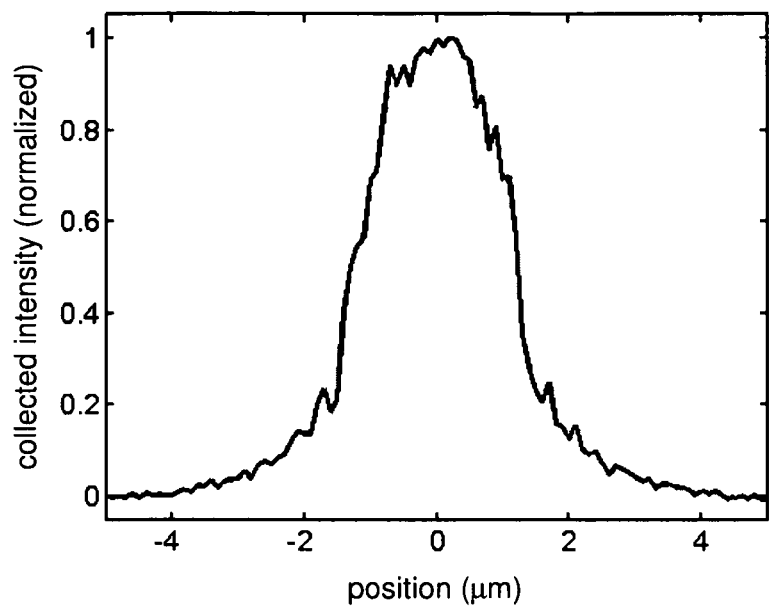
Figure 8A:
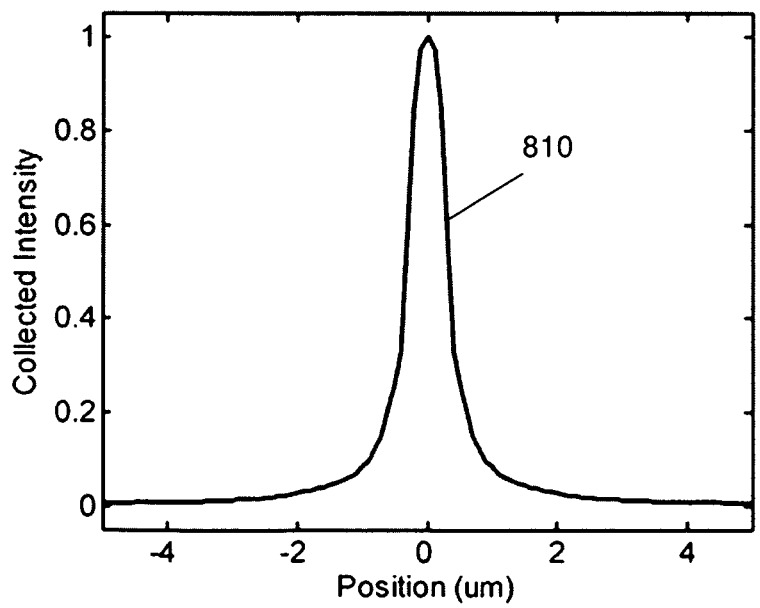
FIG. 8A is a graph of a numerical simulation for one embodiment showing collection efficiency of the zone-plate microscopy system as a function of transverse displacement Δr of a point source from the zone plate's optical axis.

FIGS. 7A-7C show the collected fluorescence as a function of relative position for fluorescing spheres with diameters of 0.5, 1.1, and 2.0 µm. Raw unfiltered data is presented, although background subtraction has been carried out. The spheres are specified by the manufacturer as having coefficients of variation of 4.7%. The piezo motor takes 30 nm discrete steps and is operated at a velocity of 50 steps per second. Frames are captured by the CCD camera at 30 Hz, resulting in a displacement of 50 nm between successive frames. Brownian motion of the trapped spheres results in a 25 nm standard deviation of their position. From FIGS. 7A-7C, the full-width half-maximum (FWHM) values of the line scans of the 0.5, 1.1, and 2 µm spheres, are 0.546±0.038 µm, 1.320±0.115 and 1.970±0.088 µm, respectively. The 0.5 µm sphere acts approximately like a point source and the FWHM of the scan agrees reasonably well with the numerically computed scan, which is shown in FIG. 8A.

EXAMPLE 2

Numerical Simulation

A numerical characterization of the zone-plate-based microscopy apparatus 100 using a non-paraxial scalar beam propagation algorithm (BPA) was carried out. For this numerical simulation, parameters of the apparatus were selected to match the experimental conditions described in Example 1. In the simulation, a point source is located at a distance of 5 µm, which is equal to the focal length, from the zone plate. The zone plate has a phase step of $\pi$ and a transmission coefficient of 0.26. The field emerging from the zone plate is then low-pass Fourier filtered up to an angle of $\theta_f$, corresponding to the maximum collection angle of the low NA telescope use in the experiment of Example 1, and the resulting intensity distribution is integrated. The spatially variant collection efficiency of the imaging system can be determined by translating the point source in the focal plane of the zone plate. The BPA assumes that the zone plate is a thin element, and that the diffraction efficiency of the zone plate is not a function of polarization or radial position. Although for high NA diffractive elements this has been shown not to be rigorously the case, numerical simulations give reasonable agreement to the experimental measurements.

FIG. 8A shows the intensity collected by the imaging system as a function of the transverse position of the point source, calculated using the BPA. The collected intensity is a sharply peaked function that reaches its maximum when the point source is aligned to the optical axis of the zone plate. The full width at half maximum of the collection peak is 660 nm when a 0.06 NA telescope is used in the back aperture of the zone plate. This value agrees reasonably well with the measured result shown in FIG. 7A.

Figure 8B:
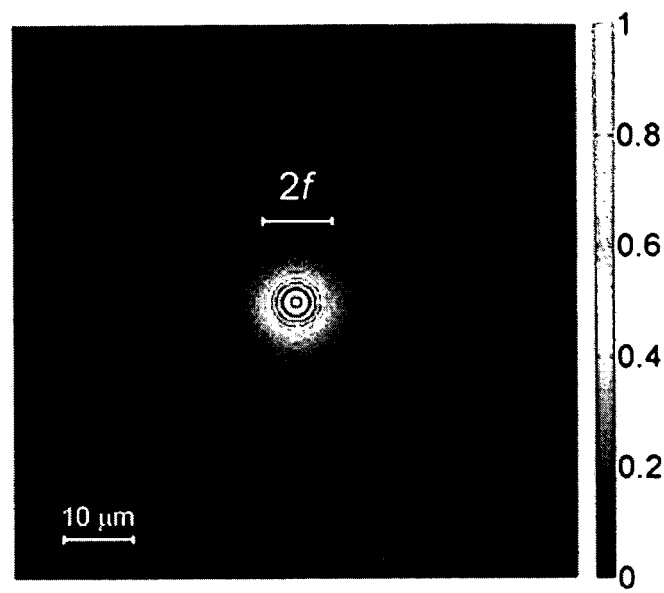
FIG. 8B illustrates a numerical simulation for the embodiment of FIG. 8A, showing the amplitude of radiation directly behind the zone plate when the point source is displaced 0.5 μm from the zone plate's optical axis.
Figure 8C:
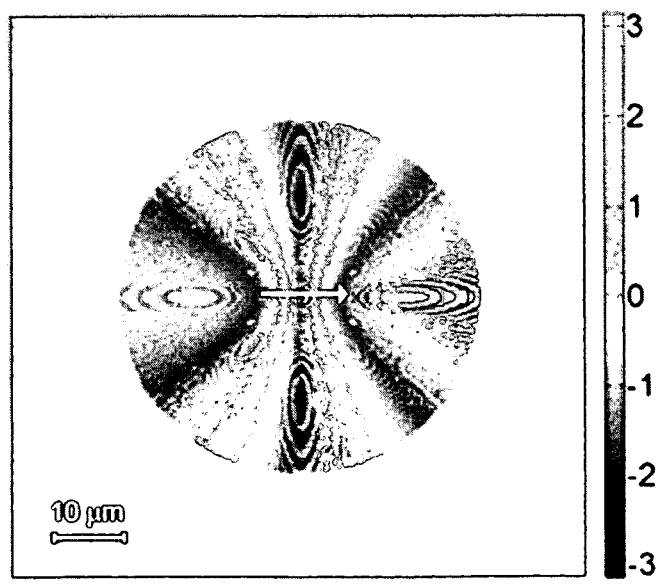
FIG. 8C illustrates a numerical simulation for the embodiment of FIG. 8A, showing the phase of the electromagnetic field directly behind the zone plate when the point source is displaced 0.5 μm from the zone plate's optical axis.

FIGS. 8B and 8C depict the amplitude and phase, respectively, of the optical field directly behind the zone plate when the point source is offset from the optical axis by 0.5 µm. The phase of the field exhibits the predicted wavefront tilt, where the direction is shown by the white arrow. The wavefront tilt is responsible for shifting the beam from the zone plate out of the aperture of the relay optic.

EXAMPLE 3

Chrome-on-Glass Zone Plate

In this example, a zone plate having a 0.93 NA value with a diameter of 50 µm and a focal length of 10 µm is fabricated and characterized. The zone plate is designed for operation in air. The zone plate is imaged by a 0.06 NA telescope onto a CCD camera. The small NA value of the telescope reduces the field of view of the microscopy apparatus to approximately 1 µm. Rather than being detrimental, however, this effect can be employed for confocal imaging. The result is that the zone-plate-based confocal microscope uses the aperture of the relay optic as its confocal pupil. This feature is highly advantageous for parallel confocal imaging with an array of zone plates. The zone plates of such an array could all share the same confocal pupil, consisting of the single relay optic. This can greatly relax or eliminate the alignment tolerance for parallel measurements, compared to the use of a zone plate array with an array of matching pinholes.

The chrome-on-glass zone plate is fabricated by patterning the zone plate in resist using electron beam lithography followed by depositing a 20 nm chrome layer in a liftoff process. A telescope consisting of two relay lenses images the zone plate onto a CCD camera with unity magnification. A fluorescence excitation laser ($\lambda$=532 nm) illuminates the zone plate and is focused at the object plane. The emitted fluorescence ($\lambda$=575 nm) is collected by the zone plate and imaged onto the CCD. In this example, the object 103 consists of fluorescent spheres, of diameter 1.1 μm, dried onto the surface of a microscope slide. The slide is placed about 10 μm from the zone plate, a distance corresponding to the zone plate's free-space focal length. Images are collected by scanning the object using a piezo driven stage and integrating the fluorescence signal collected by the CCD.

Figure 9A:
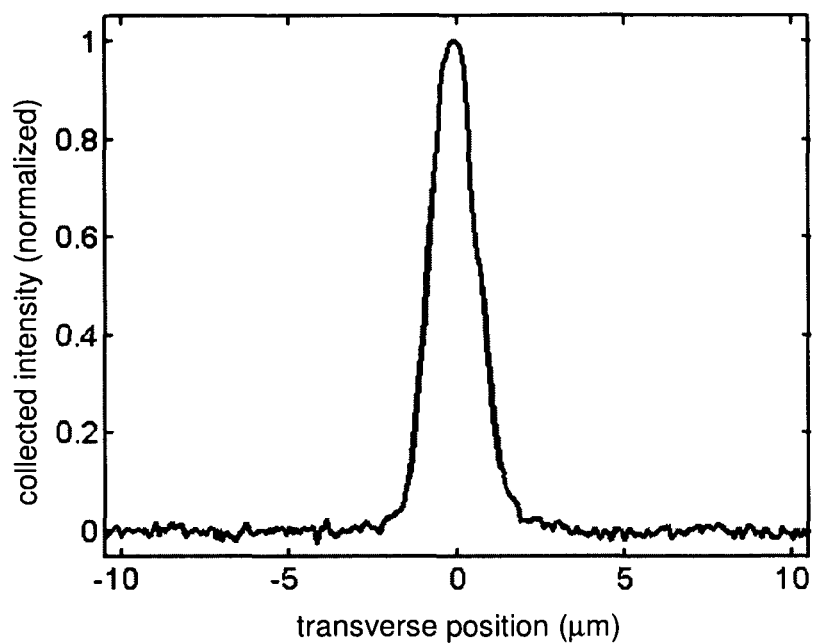
FIGS. 9A-9B are graphs of collected fluorescent signals from a fluorescing sphere moved transverse (9A) and axially (9B) with respect to the focal location on the optical axis of a microfabricated Fresnel zone plate for a second example embodiment of a zone-plate microscopy system.
Figure 9B:
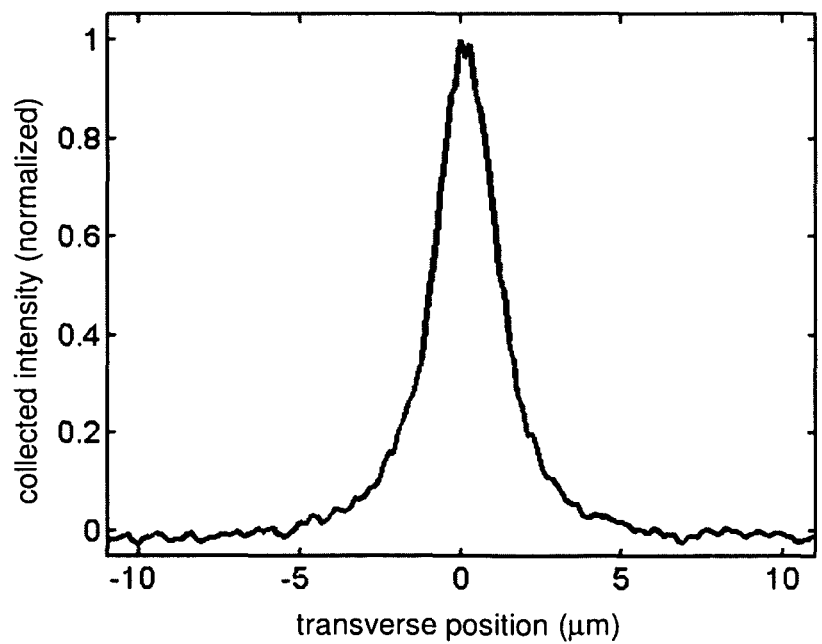

A single 1.1 μm sphere is scanned through the microscope's field of view to measure the spatial resolution of the confocal zone plate microscope. When the sphere is centered on the optical axis and the sphere-zone plate distance is equal to the focal length, the fluorescence signal peaks. As it is scanned away from this position, vignetting at the relay optic reduces the collected intensity. FIG. 9A shows a transverse scan of the object located at a distance of about 10 μm from the zone plate. FIG. 9B shows an axial scan when the sphere is centered on the optical axis and moved along the optical axis. The full width at half maximum (FWHM) of the two peaks are 1.6 and 2.2 μm for the transverse and axial cases, respectively. Because the 1.1 μm sphere is larger than a point source and approaches the measured system resolution, the true point spread function is smaller than the measured width.

CONCLUSION

All literature and similar material cited in this application, including, but not limited to, patents, patent applications, articles, books, treatises, and web pages, regardless of the format of such literature and similar materials, are expressly incorporated by reference in their entirety. In the event that one or more of the incorporated literature and similar materials differs from or contradicts this application, including but not limited to defined terms, term usage, described techniques, or the like, this application controls.

The section headings used herein are for organizational purposes only and are not to be construed as limiting the subject matter described in any way.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art.

It should be appreciated that the various techniques described herein may be operated in different modes, and that the technology is not limited to being operated in any particular mode. For example, in one embodiment, an imaging system may be operated in epifluorescence mode (i.e., the entire sample is illuminated with fluorescence excitation). In some embodiments, the imaging system may be operated in a confocal mode. The differing modes may be chosen based on a particular application. For example, the confocal mode may provide higher resolution, and may allow for three dimensional sectioning in addition to two dimensional sectioning. Thus, it should be appreciated that confocal microscopes as well as scanning microscopes may utilize one or more of the techniques described herein.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments of the invention can be implemented in any of numerous ways. For example, some embodiments may be implemented using hardware, software or a combination thereof. When any aspect of an embodiment is implemented at least in part in software, the software code can be executed on any suitable processor or collection of processors, whether provided in a single computer or distributed among multiple computers.

In this respect, various aspects of the invention, e.g., signal acquisition from the detector 150 and object 103 positioning, may be embodied at least in part as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other tangible computer storage medium or non-transitory medium) encoded with one or more programs that, when executed on one or more computers or other processors, perform methods that implement the various embodiments of the technology discussed above. The computer readable medium or media can be transportable, such that the program or programs stored thereon can be loaded onto one or more different computers or other processors to implement various aspects of the present technology as discussed above.

The terms "program" or "software" are used herein in a generic sense to refer to any type of computer code or set of computer-executable instructions that can be employed to program a computer or other processor to implement various aspects of the present technology as discussed above. Additionally, it should be appreciated that according to one aspect of this embodiment, one or more computer programs that when executed perform methods of the present technology need not reside on a single computer or processor, but may be distributed in a modular fashion amongst a number of different computers or processors to implement various aspects of the present technology.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, the technology described herein may be embodied as a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

What is claimed is:

1. An apparatus comprising:
at least one microfabricated optical element disposed on a substrate, the at least one optical element having a focusing characteristic characterized by a focal length;
a relay optic disposed in proximity to the at least one optical element and aligned with an optical axis of the at least one optical element, the relay optic configured to operate as a confocal pinhole aperture for the at least one optical element; and
wherein the at least one microfabricated optical element comprises a microfabricated Fresnel zone plate configured to collect a portion of radiation emitted from an object, the object located approximately on the optical axis and approximately at the focal length.

2. The apparatus of claim 1, wherein the at least one microfabricated optical element comprises one microfabricated optical element of an array of microfabricated optical elements wherein respective fields of view associated with at least two adjacent microfabricated optical elements in the array of microfabricated optical elements are non-overlapping.

3. The apparatus of claim 1, wherein the relay optic has a numerical aperture between about 0.01 and about 0.5.

4. The apparatus of claim 1, wherein the relay optic comprises at least one lens having a numerical aperture between about 0.01 and about 0.5.

5. The apparatus of claim 1, wherein the focal length of the Fresnel zone plate is between about 0.5 micron and about 50 microns.

6. The apparatus of claim 1, wherein the at least one microfabricated Fresnel zone plate comprises a linear array of microfabricated Fresnel zone plates and the relay optic is aligned centrally with optical axes of the zone plates of the linear array.

7. The apparatus of claim 1, wherein the at least one microfabricated Fresnel zone plate comprises a two-dimensional array of microfabricated Fresnel zone plates and the relay optic is aligned centrally with optical axes of the zone plates of the two-dimensional array.

8. The apparatus of claim 1, wherein the at least one microfabricated Fresnel zone plate is configured to have a field of view between about 200 nanometers and about 2 microns.

9. The apparatus of claim 1, wherein the at least one microfabricated Fresnel zone plate is configured to have a field of view between about 100 nanometers and about 500 nanometers.

10. The apparatus of claim 1, wherein the at least one microfabricated Fresnel zone plate is fabricated from a material having a refractive index value greater than about 2 for the radiation.

11. The apparatus of claim 10, wherein the thickness of the material is selected to provide a half-wavelength phase shift for the radiation, the radiation passing through the material.

12. The apparatus of claim 1, wherein the at least one microfabricated Fresnel zone plate is fabricated from amorphous silicon disposed on the substrate, the substrate transmitting the radiation.

13. The apparatus of claim 1, wherein the at least one microfabricated Fresnel zone plate is fabricated from a metal disposed on the substrate, the substrate transmitting the radiation.

14. The apparatus of claim 1, wherein the relay optic is configured to relay a portion of the collected portion of radiation to a detector.

15. The apparatus of claim 1 further comprising a layer of material disposed on the zone plate, the layer of material having a thickness between about one-half and about one-and-one-half of the focal length.

16. The apparatus of claim 15, wherein the layer of material transmits the radiation.

17. The apparatus of claim 15, wherein the object is positioned adjacent the layer of material.

18. The apparatus of claim 15, wherein the object is disposed in a fluid, the fluid in contact with the layer of material.

19. The apparatus of claim 1 further comprising:
an illumination source configured to illuminate the object; and
a detector arranged to receive radiation from the relay optic.

20. A method for optically inspecting an object, the method comprising:
illuminating an object;
collecting a portion of radiation emitted from the object with at least one microfabricated Fresnel zone plate disposed on a substrate, the at least one zone plate having a focusing characteristic characterized by a focal length; and
relaying at least a portion of the collected portion of radiation with a relay optic disposed in proximity to the zone plate and aligned with an optical axis of the zone plate, the relay optic configured to operate as a confocal pinhole aperture for the at least one zone plate.

21. The method of claim 20, wherein the relay optic has a numerical aperture between about 0.01 and about 0.5.

22. The method of claim 20 further comprising moving the object with respect to the at least one Fresnel zone plate, and wherein the relaying further comprises relaying the at least a portion of the collected portion of radiation to a detector.

23. The method of claim 20, wherein the focal length is between about 0.5 micron and about 50 microns.

24. The method of claim 20, wherein the at least one microfabricated Fresnel zone plate comprises a linear array of microfabricated Fresnel zone plates and the relay optic is aligned centrally with optical axes of the zone plates of the linear array.

25. The method of claim 20, wherein the at least one microfabricated Fresnel zone plate comprises a two-dimensional array of microfabricated Fresnel zone plates and the relay optic is aligned centrally with optical axes of the zone plates of the two-dimensional array.

26. The method of claim 20, wherein the at least one microfabricated Fresnel zone plate is configured to have a field of view between about 200 nanometers and about 2 microns.

27. The method of claim 20, wherein the relay optic comprises at least one refractive lens.

28. The method of claim 20 further comprising positioning the object adjacent a layer of material disposed on the zone plate, the layer of material having a thickness between about one-half and about one-and-one-half of the focal length.

29. The method of claim 28, wherein the object is disposed in a fluid, the fluid in contact with the layer of material.

30. An apparatus comprising:
an illumination source configured to provide illumination to illuminate an object;
at least one Fresnel zone plate; and
a detector configured to receive a portion of radiation emitted from the object, based at least in part on the illumination, the emitted radiation being collected by the at least one Fresnel zone plate,
wherein the apparatus does not include a conventional confocal pinhole aperture.

31. The apparatus of claim 30, further comprising a relay optic disposed between the Fresnel zone plate and the detector.

32. The apparatus of claim 31, wherein the apparatus forms at least part of a confocal microscope.

33. The apparatus of claim 31, wherein the Fresnel zone plate is a first Fresnel zone plate, and wherein the apparatus comprises a plurality of Fresnel zone plates including the first Fresnel zone plate.

34. The apparatus of claim 33, wherein the plurality of Fresnel zone plates are arranged in a two-dimensional array.

35. The apparatus of claim 31, wherein the relay optic comprises a relay lens.

* * * * *